United States Patent
Feng et al.

(10) Patent No.: US 6,282,056 B1
(45) Date of Patent: Aug. 28, 2001

(54) TAPERED STITCH POLE WRITER FOR HIGH DENSITY MAGNETIC RECORDING

(75) Inventors: Aiguo Feng, Fremont; Zhupei Shi; Bill W. Crue, Jr., both of San Jose, all of CA (US)

(73) Assignee: Read-Rite Corporation, Fremont, CA (US)

(*) Notice: Subject to any disclaimer, the term of this patent is extended or adjusted under 35 U.S.C. 154(b) by 0 days.

(21) Appl. No.: 09/289,329

(22) Filed: Apr. 8, 1999

(51) Int. Cl.[7] .................................................. G11B 5/147
(52) U.S. Cl. ............................................................ 360/126
(58) Field of Search ..................................... 360/113, 121, 360/125, 126

(56) References Cited

U.S. PATENT DOCUMENTS

| | | |
|---|---|---|
| 4,100,584 | 7/1978 | Behr et al. . |
| 4,291,351 | 9/1981 | Pennell et al. . |
| 4,622,615 | 11/1986 | Desserre . |
| 4,763,215 | 8/1988 | Gueugnon et al. . |
| 4,796,134 | 1/1989 | Watanabe et al. . |
| 4,799,118 | 1/1989 | Yamada et al. . |
| 4,926,276 | 5/1990 | Orikasa et al. . |
| 5,049,454 | 9/1991 | Johnson et al. . |
| 5,202,806 | 4/1993 | Kawase . |
| 5,296,979 | 3/1994 | Kawabe et al. . |
| 5,436,779 | 7/1995 | Valstyn . |
| 5,438,747 | 8/1995 | Krounbi et al. . |
| 5,479,696 | 1/1996 | McNeil . |
| 5,515,222 | 5/1996 | Kumagai et al. . |
| 5,519,555 | 5/1996 | Naitoh et al. . |
| 5,555,482 | 9/1996 | McNeil . |
| 5,583,728 | 12/1996 | Imazeki et al. . |
| 5,640,291 | 6/1997 | Sato et al. . |
| 5,675,460 | 10/1997 | Watanabe et al. . |
| 5,684,659 | 11/1997 | Kawase et al. . |
| 5,701,221 | 12/1997 | Taniyama et al. . |
| 5,777,827 | 7/1998 | Mizoshita et al. . |
| 6,108,167 | * 8/2000 | Tateyama et al. .................... 360/126 |

* cited by examiner

Primary Examiner—Allen T. Cao
(74) Attorney, Agent, or Firm—Robert D. Hayden

(57) ABSTRACT

The present invention describes a write element for a magnetic recording device that incorporates a second pole pedestal with a tapered shape. This tapered shape substantially reduces side-writing and the second pulse effect, each of which can limit maximum areal densities of information recorded on magnetic media. The present invention further includes a magnetic recording device incorporating a write element with a tapered second pole pedestal within the read/write head. The present invention also includes a method for producing a write element incorporating a tapered second pole pedestal.

19 Claims, 6 Drawing Sheets

TAPERED STITCH POLE WRITER FOR HIGH DENSITY MAGNETIC RECORDING

BACKGROUND OF THE INVENTION

This invention relates generally to magnetic disk data storage systems, and more particularly to a magnetic write head design and methods for making same.

Magnetic disk drives are used to store and retrieve data for digital electronic apparatuses such as computers. In FIGS. 1A and 1B, a magnetic disk data storage system 10 of the prior art includes a sealed enclosure 12, a medium motor 14, a magnetic medium or disk 16, supported for rotation by a drive spindle S1 of the medium motor 14, an actuator 18 and an arm 20 attached to an actuator spindle S2 of actuator 18. A read/write head support system consists of a suspension 22 coupled at one end to the arm 20, and at its other end to a read/write head or transducer 24.

The transducer 24 (which will be described in greater detail with reference to FIG. 1C) typically includes an inductive write element with a sensor read element. As the motor 14 rotates the magnetic disk 16, as indicated by the arrow R, an air bearing is formed under the transducer 24 causing it to lift slightly off of the surface of the magnetic disk 16, or, as it is termed in the art, to "fly" above the magnetic disk 16. Alternatively, some transducers, known as "contact heads," ride on the disk surface. Discrete units of magnetic data, known as "bits," are typically arranged sequentially in multiple concentric rings, or "tracks," on the surface of the magnetic medium. Data can be written to and/or read from essentially any portion of the magnetic disk 16 as the actuator 18 causes the transducer 24 to pivot in a short arc, as indicated by the arrows P, over the surface of the spinning magnetic disk 16. The design and manufacture of magnetic disk data storage systems is well known to those skilled in the art.

FIG. 1C depicts a magnetic read/write head 24 including a read element 26 and a write element 28. A common surface known as the air bearing surface ABS in the plane 29, is shared by the read element 26 and write element 28. The magnetically active components of both the read element 26 and the write element 28 terminate at the ABS, which faces the surface of the magnetic disk 16 (see FIG. 1A). This configuration minimizes the distance between the magnetic medium 16 and the magnetically active components of the magnetic read/write head 24 for optimal reading and writing performance.

The read element 26 includes a first shield 30, an intermediate layer 32, which functions as a second shield, and a read sensor 34 that is located between the first shield 30 and the second shield 32. The most common type of read sensor 34 used in the read/write head 24 is the magnetoresistive (AMR or GMR) sensor which is used to detect magnetic field signals from a magnetic medium through changing resistance in the read sensor.

The write element 28 is typically an inductive write element. The write element 28 includes the intermediate layer 32, which functions as a first pole, and a second pole 38 disposed above the first pole 32. The first pole 32 and the second pole 38 are attached to each other by a backgap portion 40, with these three elements collectively forming a yoke 41. Above and attached to the first pole 32 at a first pole tip portion 43, is a first pole pedestal 42 exposed along the ABS. In addition, a second pole pedestal 44 is attached to the second pole 38 at a second pole tip portion 45 and is aligned with the first pole pedestal 42. This portion of the first and second poles 42 and 44 near the ABS is sometimes referred to as the yoke tip portion 46.

A write gap 36 is formed between the first and second pole pedestals 42 and 44 in the yoke tip portion 46. The write gap 36 is made of a non-magnetic material. This non-magnetic material can be either integral with (as is shown here) or separate from a first insulation layer 47 that lies below the second pole 38 and extends from the yoke tip portion 46 to the backgap portion 40.

Also included in write element 28 is a conductive coil 48, formed of multiple winds 49. Typically, the winds 49 of the conductive coil 48 spiral around the portion of the second pole near the backgap portion 40 in a plane that is substantially perpendicular to the viewing plane of FIG. 1C. Some designs in the prior art employ several substantially parallel conductive coils arranged in a stack, rather than the single conductive coil 48 illustrated. For ease of viewing, complete winds are not shown.

The conductive coil 48 is positioned within a non-magnetic and electrically insulating medium 50 that lies above the first insulation layer 47. As is well known to those skilled in the art, current passed through the conductive coil 48 magnetizes the yoke 41 and creates a magnetic field across the write gap 36 between the first and second pole pedestals 42 and 44. The magnetic field across the write gap 36 can induce a reorientation of magnetic domains in a nearby magnetic medium such as a magnetic disk 16 (see FIG. 1A). Changing the magnetic field across the write gap 36 as the write gap 36 is moved relative to, and in close proximity with, a magnetic medium 16 can induce corresponding variations in the orientations of magnetic domains within the magnetic medium along the write element path of travel. The smallest region on the surface of the magnetic disk 16 that may be induced to have coherently oriented magnetic domains typically constitutes a single bit. By this process bits may be sequentially written along a track on the surface of the magnetic disk 16.

In FIG. 1D, a view taken along line 1D—1D of FIG. 1C further illustrates the structure of the read/write head 24. As can be seen from this view, the first and second pole pedestals 42 and 44 have substantially equal widths of Wp which are smaller than the width W of the first and second pole tip portions 32 and 38 in the yoke tip portion 46.

Of critical importance to the disk drive industry is the total quantity of information that can be written within a unit area on the surface of a magnetic disk 16. This quantity is sometimes referred to as the areal density and is typically expressed in terms of bits per square inch. The number of bits per square inch is a function of two primary factors: how many bits can be written within a unit length of a track, known as the linear density and expressed as bits per inch; and how many tracks can be placed within a unit area, known as the track density and expressed as tracks per inch. The linear density and the track density are each functions of several variables.

The linear density is a function of the length of the bits and the spacing between them, and is maximized by making the bits smaller and placed closer together. To maintain data integrity, though, bits cannot overlap. One of the problems in the prior art that limits the ability to place bits closer together is a phenomenon sometimes referred to as the second pulse effect. The second pulse effect is a problem whereby the process of writing a bit on a track actually produces two bits, a first intended bit closely followed in the track by a second unintended bit. Ordinarily, the second unintended bit is smaller than the first bit and the two bits may be distinguished on this basis. However, the very presence of the second unintended bit close behind the first intended bit precludes writing another intended bit in the unintended bit's place. Thus, these spurious unintended bits created by the second pulse effect can limit how closely legitimate intended bits may be written in a track.

The track density is a function of the trackwidth, which is also the width of the individual bits written within the track, and the spacing between the tracks. Maximization of track density is achieved by making bits narrower and by reducing the spacing between tracks. The width of a written bit is essentially a function of the dimensions of the write element at the ABS and the distance between the ABS and the magnetic disk 16. For example, in the write element of FIGS. 1C and 1D, the width is a function of the pole pedestals 42 and 44 dimensions. The spacing between tracks in theory could be completely eliminated so that the edges of adjacent tracks just touch one another. In practice, however, mechanical tolerances, such as the accuracy with which the arm 20 may be positioned, limit how closely tracks may be placed without having adjacent tracks undesirably overlap one another. Another limitation known in the art is a phenomenon sometimes referred to as side-writing. Side-writing is a problem whereby the process of writing bits to the magnetic disk 16 additionally creates spurious features adjacent to the bits but outside of the track. Consequently, if tracks are placed too near one another, these spurious features created by the side-writing phenomenon may overlap the bits on adjacent tracks. When the problem of side-writing is present, tracks may need to be placed still further apart than required by mechanical tolerance considerations.

The causes of side-writing and the second pulse effect may be related to the relative arrangement of the poles and the pole pedestals. More specifically, flux leakage at the interface between the second pole pedestal 44 and the second pole tip portion 45 may induce the second pulse effect, and flux leakage directly from the edges of the second pole tip portion 45 to the first pole tip portion 43 may create undesirable side-writing. Together, these two effects can hamper efforts to achieve higher areal densities.

Accordingly, what is desired is an easily fabricated write element that significantly reduces both side-writing and the second pulse effect to allow for higher linear densities and higher track densities thereby achieving greater areal densities.

SUMMARY OF THE INVENTION

The present invention provides a magnetic write element, a method for making the same, and a magnetic storage device incorporating the same. The magnetic write element provides a unique pole pedestal geometry for significantly reducing both side-writing and the second pulse effect.

According to an embodiment of the present invention, a magnetic write element includes a first pole having a first pole tip portion and a second pole having a second pole tip portion, both formed of magnetic material. The second pole is situated above the first pole and the two poles are connected to one another distal their respective pole tip portions. The pole tip portion of the second pole is aligned with the pole tip portion of the first pole. A second pole pedestal is connected to the second pole tip portion and is situated between the second pole tip portion and the first pole tip portion. The second pole pedestal is also formed of magnetic material and has a first surface, a second surface, a first sidewall, and a second sidewall. The first surface of the second pole pedestal faces the bottom surface of the second pole tip portion. The second pole pedestal further has a tapered shape wherein its first surface is wider than its second surface.

The magnetic write element further includes a write gap formed of non-magnetic and electrically insulating material situated between the second surface of the second pole pedestal and the first pole tip portion. Additionally, the write element includes an insulating layer formed of non-magnetic and electrically insulating material between the first pole and the second pole, and a conductive coil imbedded within it. The tapered second pole pedestal creates an advantageous geometry for the write element that significantly reduces the phenomena of side-writing and the second pulse effect, thus allowing higher areal densities to be achieved. An additional advantage may be to provide greater magnetic flux for writing by reducing magnetic flux lost to flux leakage.

Another embodiment of the present invention is a magnetic storage device comprising a read/write head, a read/write head support system, a magnetic medium, and a medium support system. The read/write head is itself comprised of a magnetic write element and a read element. The magnetic write element includes a first pole having a first pole tip portion and a second pole having a second pole tip portion, both formed of magnetic material. The second pole is situated above the first pole and the two poles are connected to one another distal their respective pole tip portions. The pole tip portion of the second pole is aligned with the pole tip portion of the first pole.

A second pole pedestal is connected to the second pole tip portion and is situated between the second pole tip portion and the first pole tip portion. The second pole pedestal is also formed of magnetic material and has a first surface, a second surface, a first sidewall, and a second sidewall. The first surface of the second pole pedestal faces the bottom surface of the second pole tip portion. The second pole pedestal further has a tapered shape wherein its first surface is wider than its second surface. The magnetic write element further includes a write gap formed of non-magnetic and electrically insulating material situated between the second surface of the second pole pedestal and the first pole tip portion. Additionally, the magnetic write element includes an insulating layer formed of non-magnetic and electrically insulating material between the first pole and the second pole, and a conductive coil imbedded within it. The read element includes a magnetoresistive read sensor positioned below the first pole and a first shield positioned below the magnetoresistive read sensor.

The magnetic storage device further includes a read/write head support system for suspending the read/write head above the magnetic medium. This system includes a means for moving the read/write head relative to the magnetic medium. The magnetic storage device also includes a medium support configured to support and move the magnetic medium in relation to the read/write head. The medium support includes a spindle for supporting the magnetic medium and a medium motor connected to the spindle for the purpose of rotating the magnetic medium around the axis of the spindle. The tapered second pole pedestal is advantageous to the magnetic storage device because it allows for higher areal densities and therefore allows the magnetic storage device to store more data on the same size disk than previously achievable by the prior art. A further advantage may be to provide more magnetic flux for writing. This advantage, in the context of a magnetic storage device, may allow read/write heads to achieve the same magnetic write flux as presently achievable in the prior art but with a lower power consumption. Alternately, for the same power consumption the same magnetic write flux could be achieved using fewer winds in the conductive coil, and fewer winds would allow the read/write head to be made more compact.

Yet another embodiment of the present invention is a method, comprising multiple operations, for forming a magnetic write element. One operation provides a first pole of a magnetic material including forming a first pole tip portion. Another operation is directed to forming a second pole pedestal of a magnetic material situated above and aligned with the first pole tip portion, the second pole pedestal having a first surface, a second surface, a first sidewall, a second sidewall, and a tapered shape. Yet another operation is directed to forming a write gap of non-magnetic and electrically insulating material located between the second surface of the second pole pedestal and the first pole tip portion. Still another operation is directed to forming a second pole of a magnetic material, including forming a second pole tip portion having a bottom surface, where the second pole tip portion is disposed above, connected to, and aligned with the first surface of the second pole pedestal. Included in this operation is the step of connecting the first and second poles to one another distal their pole tip portions. Still yet another operation is directed to forming an insulating layer having a top surface and situated between the first pole and the second pole. A further operation is directed to forming a conductive coil embedded within the insulating layer. This method advantageously allows for the fabrication of a superior write element through existing fabrication technologies, thus reducing the need to invest in costly new equipment and facilities.

These and other advantages of the present invention will become apparent to those skilled in the art upon a reading of the following descriptions of the invention and a study of the several figures of the drawings.

BRIEF DESCRIPTION OF THE DRAWINGS

The present invention will be readily understood by the following detailed description in conjunction with the accompanying drawings, with like reference numerals designating like elements.

DETAILED DESCRIPTION OF THE PREFERRED EMBODIMENTS

FIG. 1A–1D were discussed above with reference to the prior art.

Figure 1A:
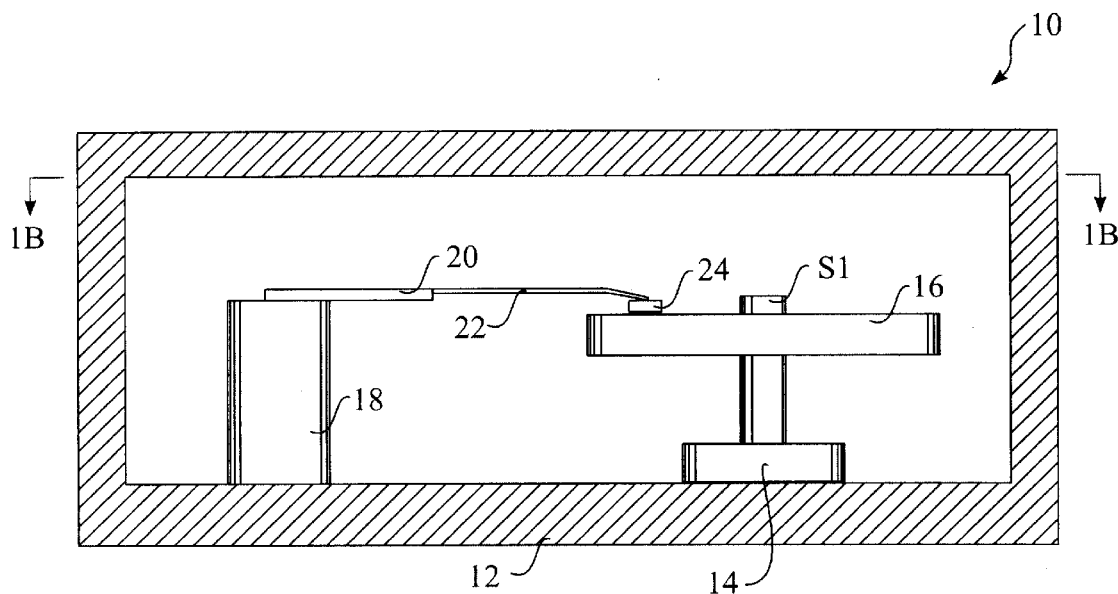
FIG. 1A is a partial cross-sectional elevation view of a magnetic storage system.
Figure 1B:
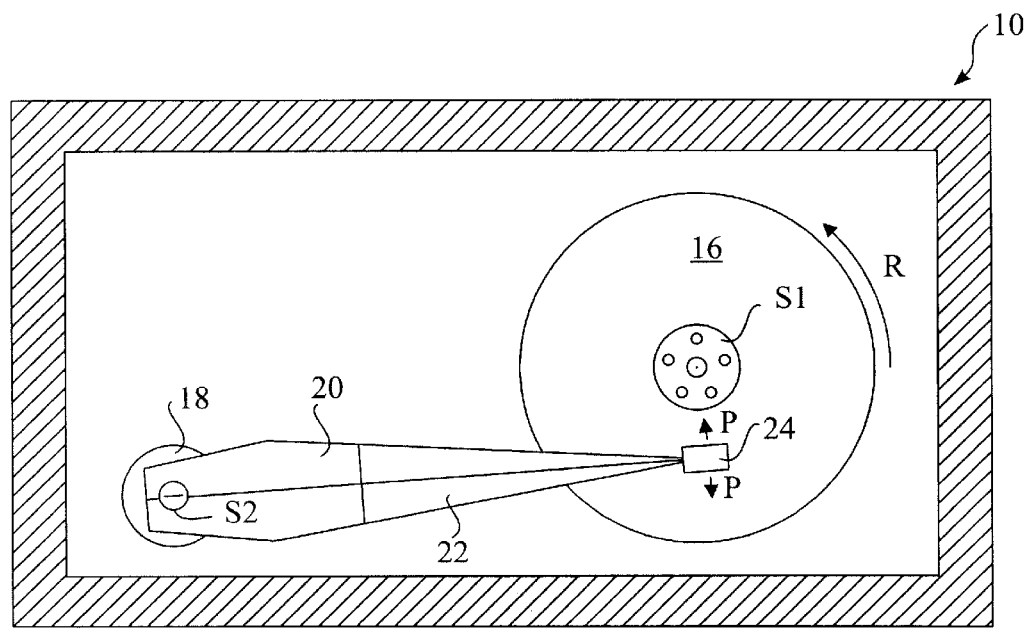
FIG. 1B is a top plan view of the magnetic storage system taken along line 1B—1B of FIG. 1A.
Figure 1C:
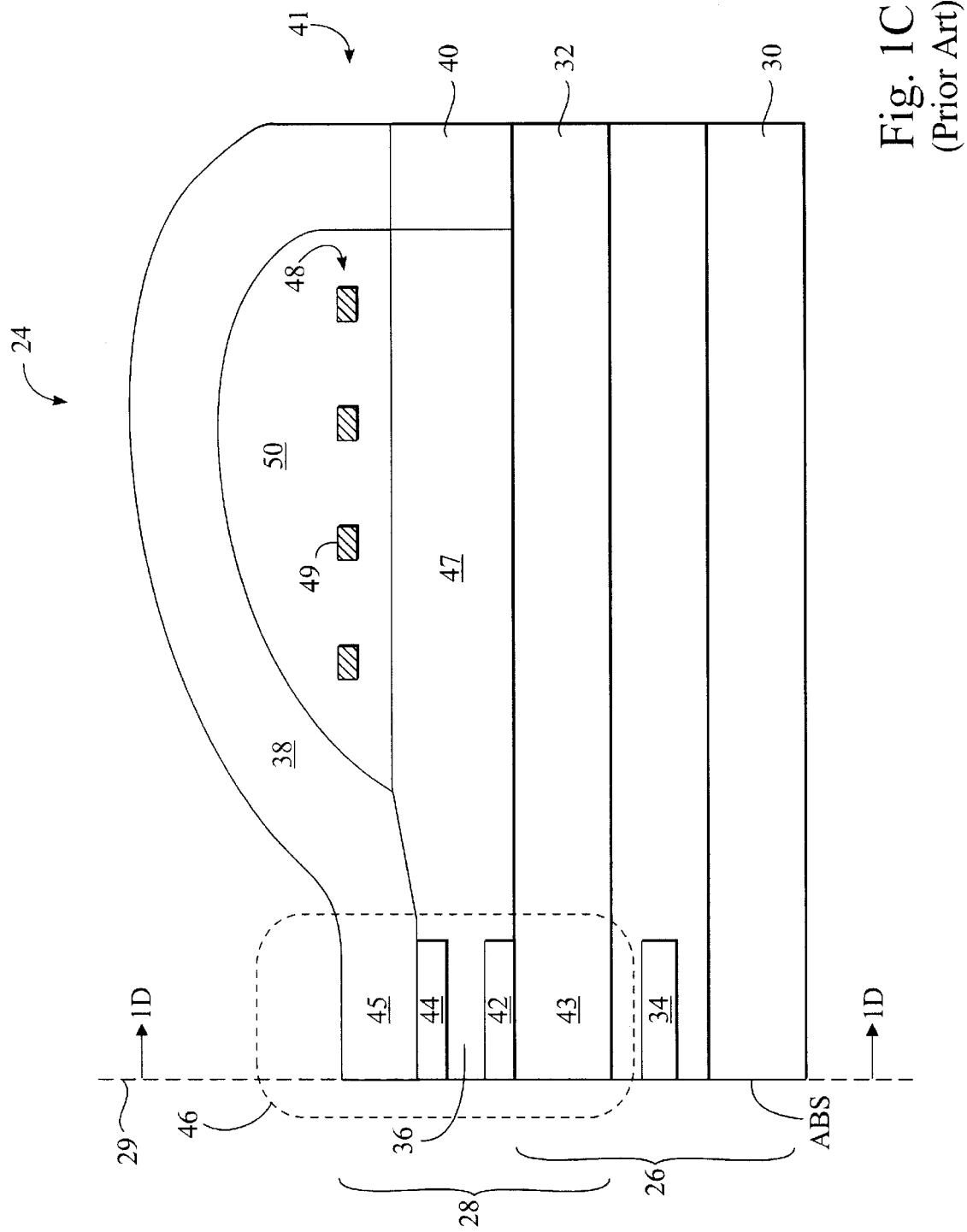
FIG. 1C is a cross-sectional view of a prior art read/write head.
Figure 1D:
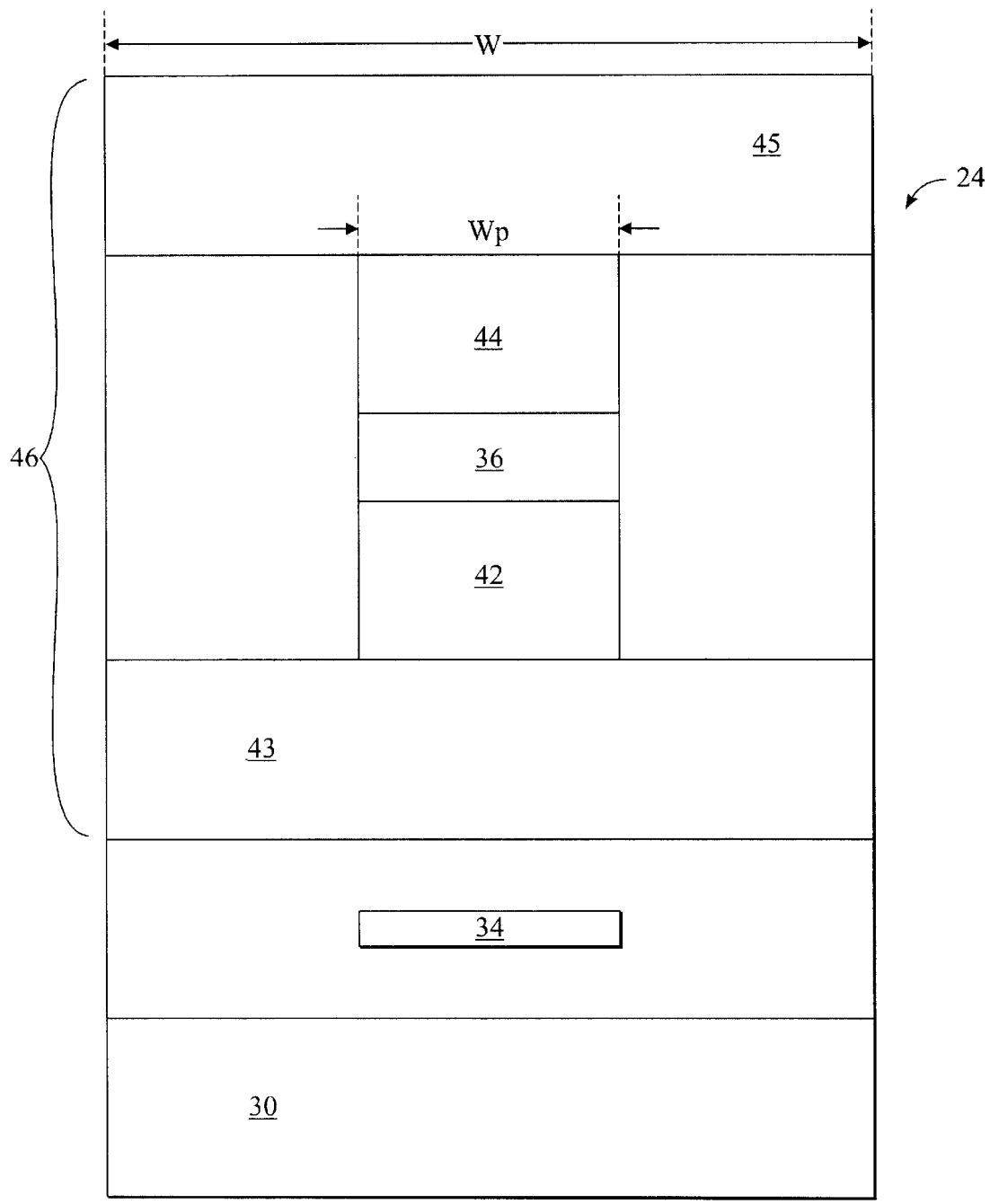
FIG. 1D is an ABS view of the prior art read/write head taken along line 1D—1D of FIG. 1C.
Figure 2:
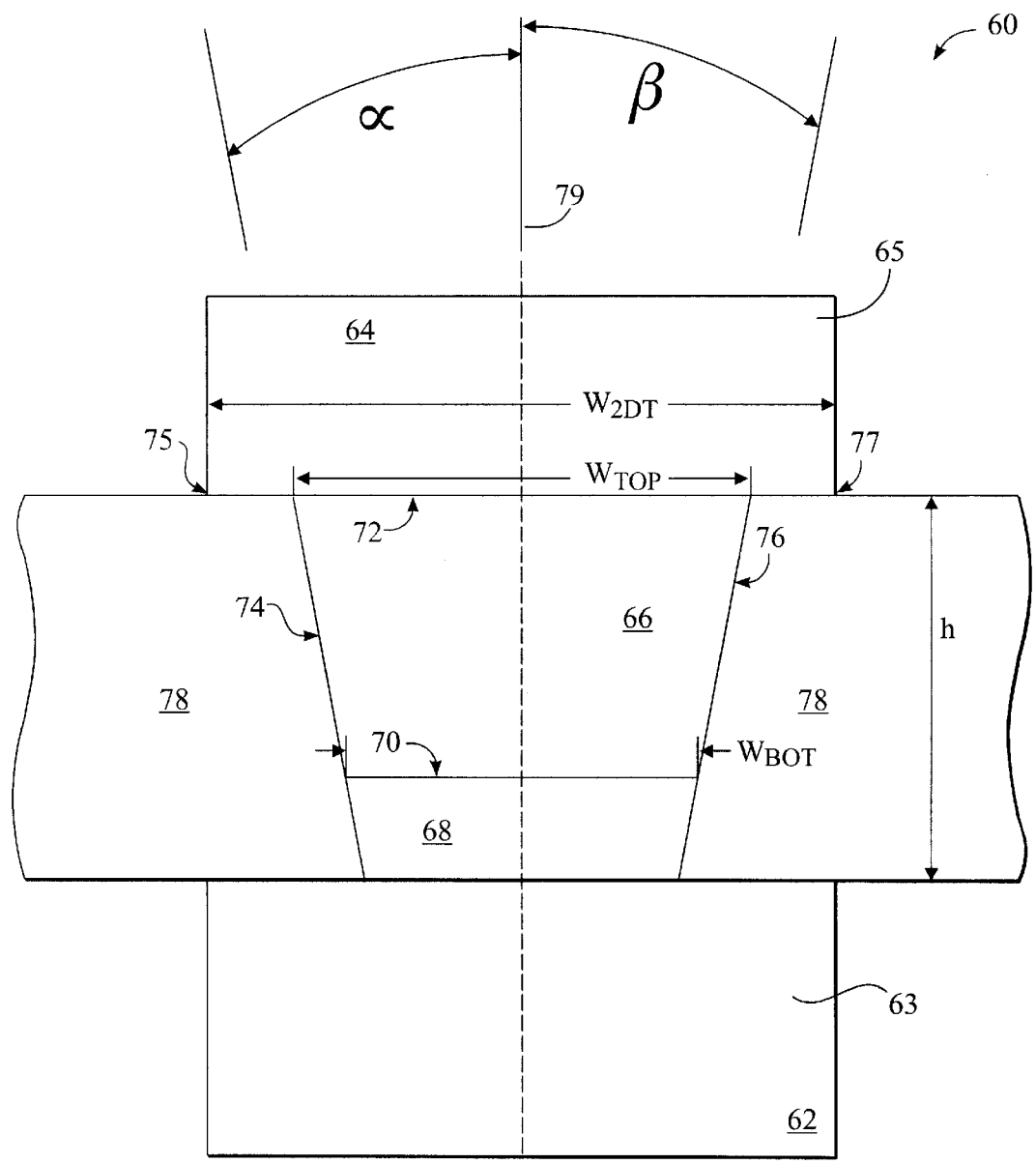
FIG. 2 is an ABS view of a magnetic write element, according to an embodiment of the present invention.

FIG. 2 is a view of a magnetic write element 60, according to an embodiment of the present invention, showing the magnetic write element as viewed from the air bearing surface (ABS). The magnetic write element 60 includes a first pole 63 having a first pole tip portion 62, a second pole 65 having a second pole tip portion 64, a second pole pedestal 66, a write gap 68, and an insulation layer 78. The magnetic write element 60 can be connected to a read element (not shown) thereby forming a read/write head. The first pole 63 of magnetic write element 60 can also operate as a second shield of the read element. The second pole 65 of magnetic write element 60 is connected to the first pole 63 by a backgap portion (not shown). The first and second poles 63 and 65 and their respective pole tip portions 62 and 64 are preferably formed of magnetic materials such as NiFe, FeN, or FeXN (where, for example, X=Ta, Al, or Rh), with materials that exhibit high magnetic moments being desirable. The backgap portion can be formed of the same or similar materials as the first pole or second pole. For example, each pole can be formed of a material or materials different from the other, with the backgap portion being formed of one or more of those materials. The write gap 68 and the insulation layer 78 are both fabricated from non-magnetic electrically insulating materials such as alumina, $Al_2O_3$.

The second pole pedestal 66 is connected to the second pole tip portion 64 of the second pole 65. The second pole pedestal 66 can be formed of the same or similar magnetic material as are the first and second poles, and/or the same or similar material as is the backgap portion. The second pole pedestal 66 has a tapered shape that imparts significantly improved magnetic writing properties to the magnetic write element 60 in that it substantially reduces side-writing and the second pulse effect. The second pole pedestal 66 includes four surfaces: a first surface 72, a second surface 70, a first sidewall 74, and a second sidewall 76. The first and second sidewalls 74 and 76 taper from the first surface 72 to the second surface 70 such that the first surface width $W_{TOP}$ is greater than the second surface width $W_{BOT}$. Additionally, both the first and second sidewalls 74 and 76 lie at angles relative to a vertical line 79 that bisects both the first pole tip portion 62 and the second pole tip portion 64. The first sidewall angle α is the angle that the first sidewall 74 forms with line 79, and the second sidewall angle β is the angle that the second sidewall 76 forms with line 79. The sidewall angles α and β can be between about 20° and about 60° with about 45° working well. The second pole pedestal 66 can be fabricated from a magnetic material characterized by a higher magnetization (Bs) than the magnetic material used to form the second pole 65 and second pole tip portion 64.

A parameter of the present invention is the ratio of the first surface width $W_{TOP}$ of the of the second pole pedestal 66 to the bottom surface width $W_{2PT}$ of the second pole tip portion 64. When the magnetization (Bs) of the second pole pedestal 66 is greater than the magnetization (Bs) of the second pole 65 and the second pole tip portion 64 this ratio can be in the range of about 0.6 to about 1.0. With ratios of less than about 0.6 the problems of side-writing and the second pulse effect may be more likely. While a ratio close to 1.0 works well for reducing side-writing and the second pulse effect, manufacturing tolerances favor ratio values lower than about 1.0. For example, a smaller ratio allows for slight misalignments of the second pole tip portion 64 with the second pole pedestal 66 while still keeping the top surface 72 of the second pole pedestal 66 between the left end 75 and the right end 77 of the second pole tip portion 64. Representative values for an embodiment of the present invention are 1.2 μm for $W_{TOP}$ and 1.5 μm for $W_{2PT}$, yielding a ratio of 0.8. Similarly, representative values for the height, h, of the second pole pedestal 66 are in the range of about 0.5 μm to about 2.5 μm.

In alternative embodiments of the present invention, the ratio of $W_{TOP}$ to $W_{2PT}$ may be greater than about 1.0. This would correspond to the situation in which the width of the first surface $W_{TOP}$ of the second pole pedestal 66 is greater than the width $W_{2PT}$ of the second pole tip portion 64. Again, while a ratio near 1.0 works well for reducing side-writing and the second pulse effect, alignment considerations suggest ratios somewhat higher than about 1.0. For embodiments in which the ratio is greater than about 1.0, the second pole 65 and second pole tip portion 64 can be fabricated from a magnetic material that is characterized by a higher magnetization (Bs) than the second pole pedestal 66.

Figure 3:
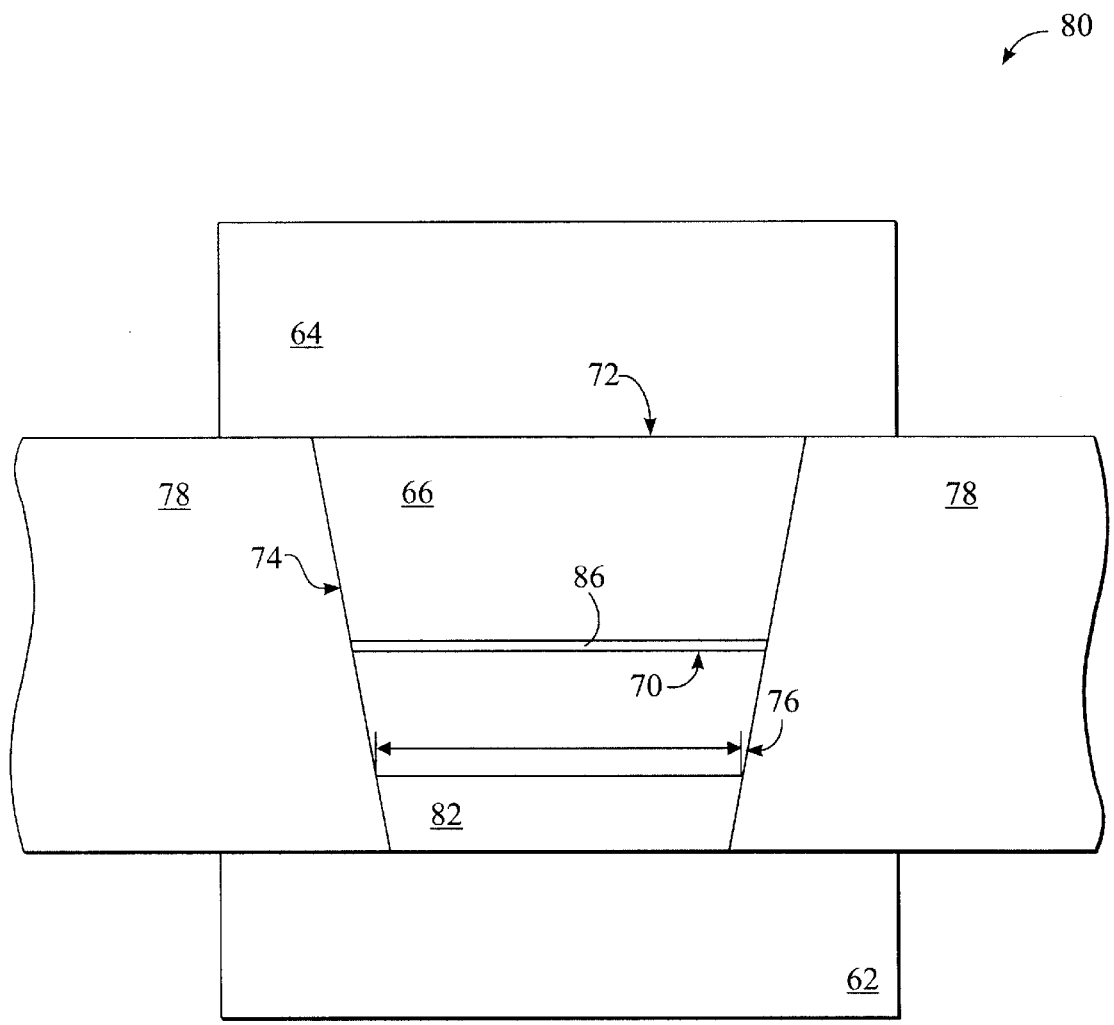
FIG. 3 is an ABS view of a magnetic write element, according to another embodiment of the present invention.

Another embodiment of the magnetic write element of the present invention 80 further includes a first pole pedestal 82 as shown in FIG. 3. The first pole pedestal 82 is fabricated from a magnetic material and is situated between the first pole tip portion 62 and the write gap 68. The first pole pedestal 82 may be either integral or non-integral with the first pole tip portion 62. In the embodiment where the first pole pedestal 82 is integral with the first pole tip portion 62, the first pole pedestal 82 can be fabricated from the same layer of magnetic material from which the first pole tip portion 62 is formed. By contrast, in embodiments where the first pole pedestal 82 is non-integral, the first pole pedestal 82 may be formed of a different layer of magnetic material than the layer used to form the first pole tip portion 62.

FIG. 3 also shows a seed layer 86. The seed layer 86 is situated between the second pole pedestal 66 and the write gap 68, however, alternative embodiments do not include a seed layer. Seed layers may be used to improve the adhesion of electroplated thick NiFe magnetic layers, while seed layers are typically unnecessary for satisfactory adhesion of sputtered films, as is well known in the art.

Yet another embodiment of the present invention is directed towards a magnetic storage device comprising a read/write head that incorporates a write element of the present invention with the tapered second pole pedestal 66, and with or without a first pole pedestal 82 as described above. This embodiment integrates the write element with a read element according to a design that is well known to those skilled in the art of read/write head fabrication, as shown, for example, in FIG. 1D of the prior art.

The embodiment setting forth a magnetic storage device can further include a support system for the read/write head, a magnetic medium, and a medium support. The read/write head support system further includes a suspension system and actuator for precision positioning of the read/write head relative to the magnetic medium and for damping vibrations that may affect the spacing between the read/write head and the magnetic medium as well as affect the ability for the read/write head to remain fixed over a specific track on the magnetic medium. Such suspensions and actuators are well known to those skilled in the art of magnetic disk drives. Similarly, this embodiment includes a magnetic medium and a support for that medium which can include a spindle and a motor for rotating the medium around the axis of the spindle according to designs well known to those skilled in the art. Another embodiment of this magnetic storage device contains the further element of a first pole pedestal 82 as part of the magnetic write element as described above.

Still another embodiment of the present invention is a method 100 for fabricating a magnetic write element incorporating a tapered second pole pedestal. This embodiment is outlined in a process diagram shown in FIG. 4.

Operation 102 provides for a first pole including a first pole tip portion. The first pole and pole tip portion may be formed of a magnetic material such as NiFe, FeN, or FeXN (where, for example, X=Ta, Al, or Rh). Operation 102 may include electroplating or another deposition technique.

Operation 104 includes the formation of a second pole pedestal having a tapered shape and located above the first pole tip portion. The second pole pedestal may be formed of a magnetic material such as NiFe, FeN, or FeXN (where, for example, X=Ta, Al, or Rh), with materials that exhibit high magnetic moments being desirable. It is not essential, however, that the second pole pedestal be formed of the same materials as the first pole. The formation of the tapered shape may be accomplished in numerous ways. In one embodiment, the tapered shape is formed by creating a plating dam with the desired tapered shape. The plating dam is then filled with the desired magnetic material, for example, by a plating operation, and finally the plating dam is removed by, for example, dissolution.

In another embodiment the tapered shape is formed by first providing a second pole pedestal with essentially vertical sidewalls. This may be accomplished, for example, by electroplating with or without the benefit of a seed layer as is well known to those skilled in the art. Next, the material from the sidewalls is removed until the desired tapered shape is achieved. Material may be removed from the sidewalls, for example, by polishing, shaving, ion milling, combinations of these processes, or by other known techniques.

In a particular embodiment the tapered shape is partially formed by ion milling one sidewall, and separately ion milling the other sidewall. Yet another envisioned embodiment calls for the partial formation of the tapered shape by ion milling both sidewalls, with the ion milling being terminated before the desired tapered shape is achieved. The desired tapered shape is later achieved by an additional ion milling operation that works on both the second pole pedestal and the first pole tip portion simultaneously. In this last embodiment an integral first pole pedestal is formed from the top surface of the first pole tip portion while the desired tapered shape of the second pole pedestal is finished.

The formation of a write gap made of a non-magnetic and electrically insulating material is provided for in operation 106. Many suitable non-magnetic electrically insulating materials are known in the art such as alumina ($Al_2O_3$), silica ($SiO_2$), and silicon carbide (SiC). The write gap may be formed between the second pole pedestal and the first pole tip portion, however, in embodiments of the present invention that also include a first pole pedestal, the write gap may be formed between the second pole pedestal and the first pole pedestal.

The formation of the write gap may be accomplished in numerous ways. One method by which the write gap may be formed is by first forming a mold with the desired dimensions and then filling the mold with the desired material, for example by chemical vapor deposition (CVD). After filling, the mold may be removed, for example, by dissolution. A suitable mold may be formed, for example, by photolithography techniques well known to those skilled in the art.

Another method for forming the write gap may be accomplished by depositing a continuous layer of the desired material, for example, by CVD, and then removing all of the layer except in the desired location. Unwanted portions of the continuous layer may be removed by masking the portion sought to be retained and subjecting the remainder of the continuous layer to a removal process such as reactive ion etching (RIE). Alternatively, a continuous layer may serve as both the write gap and as all or part of the insulating layer formed in operation 108 discussed below. In such a situation the write gap is said to be integral with the insulation layer of operation 108.

Operation 108 includes forming an insulating layer of a non-magnetic and electrically insulating material. The insulating layer may be formed above the first pole and in contact with the left and right sidewalls of the second pole pedestal and the side of the second pole pedestal opposite the ABS. Several suitable non-magnetic electrically insulating materials such as alumina, as previously described, can be used. Forming the insulating layer may be accomplished in numerous ways. As previously described with reference to the write gap formation in operation 106, one method may include forming a continuous layer by a deposition technique such as CVD, such that the insulation layer is integral with the write gap. Alternately, the insulating layer may be built up with multiple layers, and the individual layers need not be of the same composition. It may also be desirable to partially form the insulating layer, perform other operations, and then complete the insulation layer.

Forming an embedded conductive coil within the insulating layer is provided in operation 110. A conductive coil may be formed as a spiral with an open middle portion and lying substantially in a single plane, and situated with the open middle portion of the spiral substantially centered on a backgap that connects the first pole with a second pole (discussed below). Forming more than one conductive coil stacked in substantially parallel layers, as is well known in the art, can also be included in the method 100. Conductive coils may be fabricated from any electrically conductive material, but copper (Cu) is known to work well. It may be desirable to combine operations 108 and 110 such that parts of the insulation layer and the conductive coil are alternatively formed until both operations are complete. The conductive coils can be formed by photolithography techniques well known in the art.

Operation 112 provides for the formation of a second pole including a second pole tip portion. The second pole may be located above the insulation layer and above the second pole pedestal such that the second pole tip portion may be connected to the second pole pedestal. The second pole may connect to a backgap that further connects to the first pole. The backgap may be located distal to the first and second pole tip portions, and together with the first and second poles forms the yoke. The second pole and pole tip portion may be formed of a magnetic material such as NiFe, FeN, or FeXN (where, for example, X=Ta, Al, or Rh), with materials that exhibit high magnetic moments being desirable. It is not essential, however, that the second pole be formed of the same materials as the first pole or as the second pole pedestal. Forming the second pole and pole tip portion may be accomplished by electroplating, with or without the benefit of a seed layer, or by another suitable deposition technique known to those with ordinary skill in the art.

Figure 4:
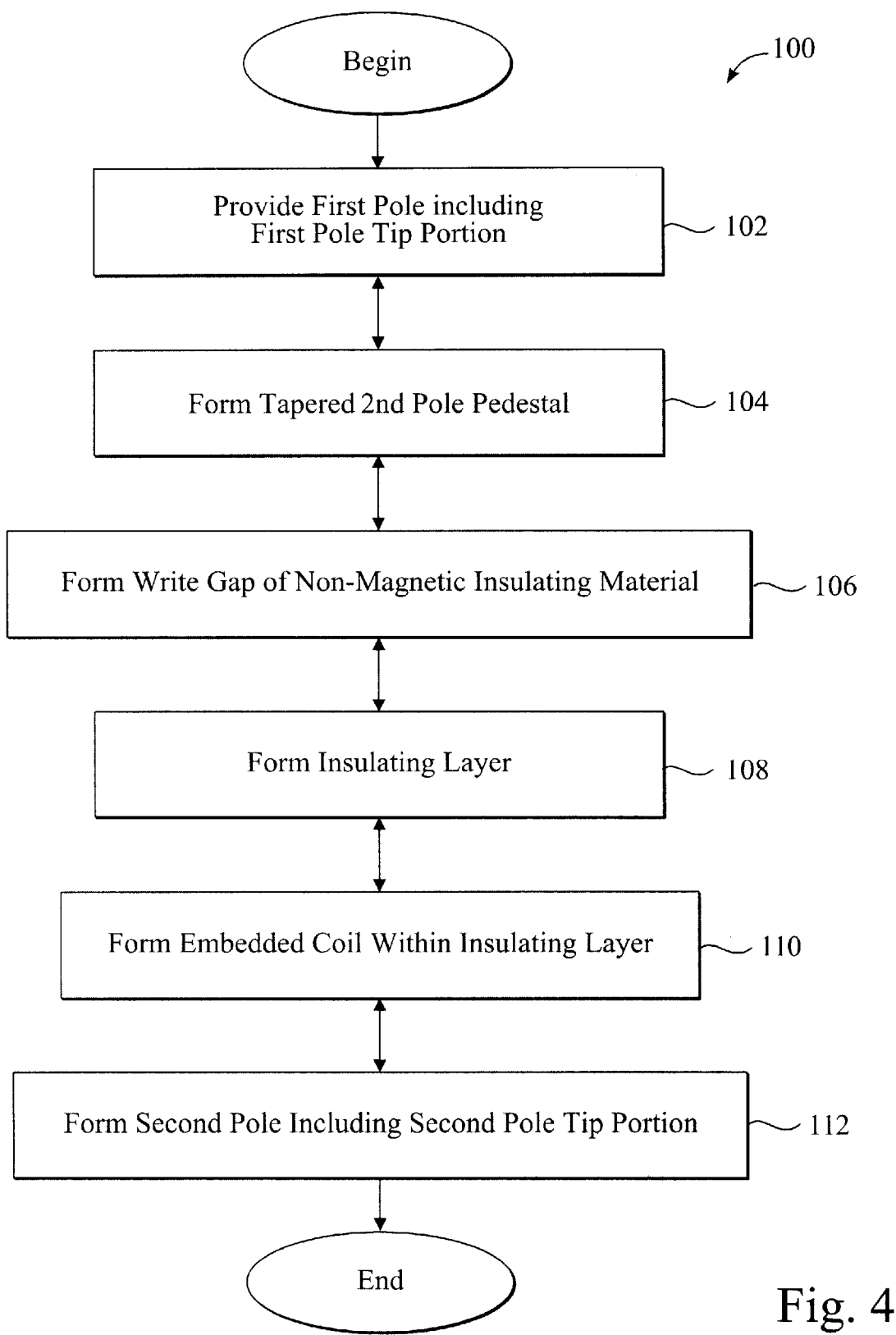
FIG. 4 is a process diagram of a method for fabricating a magnetic write element, according to yet another embodiment of the present invention.

It should be noted that although the operations shown in FIG. 4 and described above are provided in a certain order for the sake of clarity, the order of presentation is not meant to imply a specific order in which the steps are to be carried out.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A magnetic write element comprising:
   a first pole formed of magnetic material and having a first pole tip portion;
   a second pole disposed above said first pole and having a second pole tip portion including a bottom surface, wherein said second pole tip portion is aligned with said first pole tip portion, said second pole being formed of magnetic material that is connected to said first pole distal said pole tip portions;
   a second pole pedestal connected to said second pole tip portion and disposed between said second pole tip portion and said first pole tip portion, wherein said second pole pedestal has a first surface, a second surface, a substantially planar first sidewall, and a substantially planar second sidewall, and formed of magnetic material, said second pole pedestal having a tapered shape wherein said first surface of said second pole pedestal is wider than said second surface of said second pole pedestal;
   a write gap formed of non-magnetic and electrically insulating material disposed between said second pole pedestal and said first pole tip portion;
   a first pole pedestal disposed between said first pole tip portion and said write gap and connected to said first pole tip portion and bounded by said first and second sidewalls;
   an insulating layer formed of non-magnetic and electrically insulating material disposed between said first pole and said second pole; and
   a conductive coil imbedded within said insulating layer.

2. The magnetic write element according to claim 1, wherein a ratio of a width of said first surface of said second pole pedestal to a width of said bottom surface of said second pole tip portion is in the range of about 0.6 to about 1.0.

3. The magnetic write element according to claim 1 wherein a ratio of a width of said first surface of said second pole pedestal to a width of said bottom surface of said second pole tip portion is at least about 1.0 and said second pole is formed of a magnetic material characterized by a higher magnetization (Bs) than a magnetization (Bs) of said second pole pedestal.

4. The magnetic write element according to claim 2, wherein said first sidewall and said second sidewall of said second pole pedestal each define an angle within the range of about 20° to about 60°, wherein said angle is measured from a vertical line that bisects said first pole tip portion and said second pole tip portion.

5. The magnetic write element according to claim 2, wherein said first sidewall and said second sidewall of said second pole pedestal each define an angle of about 45° measured from a vertical line that bisects said first pole tip portion and said second pole tip portion.

6. The magnetic write element according to claim 3, wherein said first sidewall and said second sidewall of said second pole pedestal each define an angle within the range of about 20° to about 60° measured from a vertical line that bisects said first pole tip portion and said second pole tip portion.

7. The magnetic write element according to claim 3, wherein said first sidewall and said second sidewall of said second pole pedestal each define an angle of about 45° measured from a vertical line that bisects said first pole tip portion and said second pole tip portion.

8. The magnetic write element according to claim 1, wherein a ratio of a width of said first surface of said second pole pedestal to a width of said bottom surface of said second pole tip portion is in the range of about 0.6 to about 1.0.

9. The magnetic write element according to claim 1, wherein a ratio of a width of said first surface of said second pole pedestal to a width of said bottom surface of said second pole tip portion is at least about 1.0 and said second pole is formed of a magnetic material characterized by a higher magnetization (Bs) than a magnetization (Bs) of said second pole pedestal, and wherein said first sidewall and said second sidewall of said second pole pedestal each define an angle within the range of about 20° to about 60° measured from a vertical line that bisects said first pole tip portion and said second pole tip portion.

10. The magnetic write element according to claim 8, wherein said first sidewall and said second sidewall of said second pole pedestal each define an angle within the range of about 20° to about 60° measured from a vertical line that bisects said first pole tip portion and said second pole tip portion.

11. The magnetic write element according to claim 8, wherein said first sidewall and said second sidewall of said second pole pedestal each define an angle of about 45° measured from a vertical line that bisects said first pole tip portion and said second pole tip portion.

12. A magnetic storage device, comprising:
   a) a read/write head including,
      a magnetic write element including,
         a first pole formed of magnetic material and having a first pole tip portion,
         a second pole disposed above said first pole and having a second pole tip portion including a bottom surface, wherein said second pole tip portion is aligned with said first pole tip portion, said second pole being formed of magnetic material that is connected to said first pole distal said pole tip portions,
         second pole pedestal connected to said second pole tip portion and disposed between said second pole tip portion and said first pole tip portion, wherein said second pole pedestal has a first surface, a second surface, a substantially planar first sidewall, and a substantially planar second sidewall, and formed of magnetic material, said second pole pedestal having a tapered shape wherein said first surface of said second pole pedestal is wider than said second surface of said second pole pedestal,
         a write gap formed of non-magnetic and electrically insulating material disposed between said second pole pedestal and said first pole tip portion,
         a first pole pedestal disposed between said first pole tip portion and said write gap and connected to said first pole tip portion and bounded by said first and second sidewalls;
         an insulating layer formed of non-magnetic and electrically insulating material disposed between said first pole and said second pole, and
         a conductive coil imbedded within said insulating layer, and a read element including,
         a magnetoresistive read sensor positioned below said first pole, and
         a first shield positioned below said magnetoresistive read sensor, thereby forming a read element with said magnetoresistive read sensor and said first pole; and
   b) a medium support configured to support and move a magnetic medium in relation to said read/write head, wherein said medium support includes a spindle on which said medium can be supported, said spindle having an axis about which said medium can rotate, and a medium motor connected to said spindle and capable of facilitating said moving of said medium relative to said read/write head; and
   c) a read/write head support system for suspending said read/write head proximate said magnetic medium and including a means for moving said read/write head relative to said magnetic medium.

13. The magnetic storage device according to claim 12, further comprising a magnetic medium.

14. A method for forming a magnetic write element, comprising:
   a) providing a first pole of a magnetic material including providing a first pole tip portion;
   b) forming a first pole pedestal connected to said first pole;
   c) forming a write gap of non-magnetic and electrically insulating material disposed between said second pole pedestal and said first pole tip portion;
   d) forming a second pole pedestal of a magnetic material disposed above and aligned with said first pole tip portion, said second pole pedestal having a first surface and a second surface;
   e) tapering said first and second pole pedestals such that substantially planar first and second sidewalls are formed thereon, said sidewalls bounding both pole pedestals;
   f) forming an insulating layer having a top surface and disposed between said first pole and said second pole;
   g) forming a conductive coil embedded within said insulating layer, and
   h) forming a second pole of a magnetic material, including forming a second pole tip portion having a bottom surface, wherein said second pole tip portion is disposed above, connected to, and aligned with said first surface of said second pole pedestal, and said second pole is connected to said first pole distal said pole tip portions.

15. The method as recited in claim 14, further comprising the step of forming a seed layer disposed between said second pole pedestal and said write gap.

16. The method as recited in claim 14, wherein said first surface of said second pole pedestal is formed with a first width, and said bottom surface of said second pole tip portion is formed with a second width, and a ratio of said first width to said second width is in the range of about 0.6 to about 1.0.

17. The method as recited in claim 14, further comprising the step of planarizing said first surface of said second pole pedestal and said top surface of said insulating layer until both said surfaces are substantially coplanar.

18. The method recited in claim 14, wherein tapering said first and second pole pedestals is achieved by ion milling.

19. The method in claim 18, wherein said ion milling is performed until said first and second sidewalls each define an angle within the range of about 20° to about 60° as measured from a vertical line that bisects said first pole tip portion and said second pole tip portion.

* * * * *